United States Patent
Sarikaya

(12) 
(10) Patent No.: US 10,706,237 B2
(45) Date of Patent: *Jul. 7, 2020

(54) CONTEXTUAL LANGUAGE GENERATION BY LEVERAGING LANGUAGE UNDERSTANDING

(71) Applicant: Microsoft Technology Licensing, LLC, Redmond, WA (US)

(72) Inventor: Ruhi Sarikaya, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 316 days.

This patent is subject to a terminal disclaimer.

(21) Appl. No.: 15/720,174

(22) Filed: Sep. 29, 2017

(65) Prior Publication Data

US 2018/0024994 A1    Jan. 25, 2018

Related U.S. Application Data

(63) Continuation of application No. 14/740,082, filed on Jun. 15, 2015, now Pat. No. 9,792,281.

(51) Int. Cl.
*G06F 40/40* (2020.01)
*G06F 16/332* (2019.01)
*G06F 40/253* (2020.01)

(52) U.S. Cl.
CPC .......... *G06F 40/40* (2020.01); *G06F 16/3322* (2019.01); *G06F 40/253* (2020.01)

(58) Field of Classification Search
USPC ........................................................ 707/708
See application file for complete search history.

(56) References Cited

U.S. PATENT DOCUMENTS 6,622,119 B1    9/2003    Ramaswamy et al.
6,968,334 B2    11/2005    Salmenkaita et al.
(Continued)

FOREIGN PATENT DOCUMENTS

WO    2015081128 A1    6/2015
WO    2017027207 A1    2/2017

OTHER PUBLICATIONS

"Notice of Allowance Issued in U.S. Appl. No. 14/740,082", dated Jun. 5, 2017, 13 Pages.
(Continued)

*Primary Examiner* — Cam Linh T Nguyen

(57) ABSTRACT

Technology is provided for improving digital assistant performance by generating and presenting suggestions to users for completing a task or a session. To generate the suggestions, a machine learned language prediction model is trained with features extracted from multiple sources, such as log data and session context. When input is received from a user, the trained machine learned language prediction model is used to determine the most likely suggestion to present to the user to lead to successful task completion. In generating the suggestion, intermediate suggestion data, such as a domain, intent, and/or slot, is generated for the suggestion. From the generated intermediate suggestion data for the suggestion, a surface form of the suggestion is generated that can be presented to the user. The resulting suggestion and related context may further be used to continue training the machine learned language prediction model.

20 Claims, 11 Drawing Sheets

(56) References Cited

U.S. PATENT DOCUMENTS

| | | |
|---|---|---|
| 7,398,211 B2 | 7/2008 | Wang |
| 7,539,656 B2 | 5/2009 | Fratkina et al. |
| 7,620,610 B2 | 11/2009 | Macbeth et al. |
| 7,650,319 B2 | 1/2010 | Hoffberg et al. |
| 7,853,449 B2 | 12/2010 | Dharanipragada et al. |
| 7,890,329 B2 | 2/2011 | Wu et al. |
| 8,204,751 B1 | 6/2012 | Di Fabbrizio et al. |
| 8,676,937 B2 | 3/2014 | Rapaport et al. |
| 8,706,750 B2 | 4/2014 | Hansson et al. |
| 8,738,459 B2 | 5/2014 | Virdhagriswaran |
| 9,043,296 B2 | 5/2015 | Mital et al. |
| 9,183,257 B1 | 11/2015 | Buchanan et al. |
| 9,418,336 B2 | 8/2016 | Peev et al. |
| 9,552,350 B2 | 1/2017 | Brown et al. |
| 9,792,281 B2 | 10/2017 | Sarikaya |
| 2002/0133347 A1 | 9/2002 | Schoneburg et al. |
| 2002/0147578 A1 | 10/2002 | O'Neil et al. |
| 2003/0126136 A1 | 7/2003 | Omoigui |
| 2003/0126138 A1 | 7/2003 | Walker et al. |
| 2004/0162724 A1 | 8/2004 | Hill et al. |
| 2005/0080775 A1 | 4/2005 | Colledge et al. |
| 2008/0034032 A1 | 2/2008 | Healey et al. |
| 2011/0016421 A1 | 1/2011 | Krupka et al. |
| 2011/0302149 A1 | 12/2011 | Vadlamani et al. |
| 2012/0005148 A1 | 1/2012 | Horvitz et al. |
| 2012/0005219 A1 | 1/2012 | Apacible et al. |
| 2012/0016678 A1 | 1/2012 | Gruber et al. |
| 2012/0036123 A1* | 2/2012 | Hasan .................. G06Q 30/02 707/723 |
| 2012/0047025 A1* | 2/2012 | Strohman .......... G06Q 30/0275 705/14.71 |
| 2012/0117005 A1 | 5/2012 | Spivack |
| 2013/0007055 A1 | 1/2013 | Brown et al. |
| 2013/0226892 A1 | 8/2013 | Ehsani et al. |
| 2014/0040274 A1 | 2/2014 | Aravamudan et al. |
| 2014/0114901 A1 | 4/2014 | Pradhan et al. |
| 2014/0280081 A1 | 9/2014 | Tropin et al. |
| 2014/0337329 A1 | 11/2014 | Brown |
| 2015/0178273 A1 | 6/2015 | Hakkani-Tur et al. |
| 2015/0363485 A1 | 12/2015 | Bennett et al. |
| 2016/0154792 A1 | 6/2016 | Sarikaya et al. |
| 2016/0171062 A1 | 6/2016 | Bufe et al. |
| 2016/0227291 A1 | 8/2016 | Shaw et al. |
| 2016/0364382 A1 | 12/2016 | Sarikaya |
| 2019/0012373 A1 | 1/2019 | Malik et al. |

OTHER PUBLICATIONS

Ion, Florence, "If Google Now Isn't Cutting it, Give Sherpa a Try Instead", Retrieved from <<http://arstechnica.com/gadgets/2013/04/if-google-now-isnt-cutting-it-give-sherpa-a-try-instead/>>, Apr. 20, 2013, 5 Pages.

Xue, Xiaobing, "Modeling Reformulation using Passage Analysis", In Proceedings of the 19th ACM International Conference on Information and Knowledge Management, Oct. 26, 2010, 4 Pages.

"International Search Report and Written Opinion Issued in PCT Application No. PCT/US2016/037294", dated Aug. 25, 2016, 12 Pages.

"Second Written Opinion Issued in PCT Application No. PCT/US2016/037294", dated Jun. 8, 2017, 7 Pages.

Wang, et al., "Leveraging Semantic Web Search and Browse Sessions for Multi-Turn Spoken Dialog Systems", In IEEE International Conference on Acoustics, Speech and Signal Processing, May 4, 2014, 5 Pages.

"International Preliminary Report on Patentability Issued in PCT Application No. PCT/US2016/037294", dated Sep. 19, 2017, 8 Pages.

U.S. Appl. No. 14/740,082, Amendment after Allowance filed Sep. 5, 2017, 6 pages.

U.S. Appl. No. 14/740,082, USPTO Response after Amendment after Allowance dated Sep. 21, 2017, 2 pages.

"Office Action Issued in European Patent Application No. 16731757.7", dated Jun. 4, 2019, 13 Pages.

"Non Final Office Action Issued in U.S. Appl. No. 15/645,529", dated Feb. 14, 2019, 16 Pages.

"Final Office Action Issued in U.S. Appl. No. 15/645,529", dated Aug. 23, 2019, 14 Pages.

"International Search Report & Written Opinion Issued in PCT Application No. PCT/US2018/034530", dated Aug. 24, 2018, 14 Pages.

Pradhan, et al., "Building a Foundation System for Producing Short Answers to Factual Questions", In Proceedings of Text Retrieval Conference (TREC), Nov. 19, 2002, 10 Pages.

"Summons to Attend Oral Proceedings Issued in European Patent Application No. 16731757.7", dated Nov. 21, 2019, 18 Pages.

"Non Final Office Action Issued in U.S. Appl. No. 15/645,529", dated Feb. 4, 2020, 15 Pages.

* cited by examiner

CONTEXTUAL LANGUAGE GENERATION BY LEVERAGING LANGUAGE
UNDERSTANDING

CROSS-REFERENCE TO RELATED APPLICATIONS

This application is a continuation of U.S. patent application Ser. No. 14/740,082, now U.S. Pat. No. 9,792,281, filed on Jun. 15, 2015, titled "CONTEXTUAL LANGUAGE GENERATION BY LEVERAGING LANGUAGE UNDERSTANDING," which is incorporated herein by reference. To the extent appropriate, a claim for priority is made the above-identified application.

BACKGROUND

Digital assistant applications that can receive requests to perform tasks for users continue to grow in popularity. Many of these applications are being incorporated into personal computers, laptops, mobile devices, as well as other similar types of devices. While the abilities and types of tasks that a digital assistant is able to perform are substantial, users of digital assistants are often unaware of the total extent of the operations a digital assistant application can perform. Users may not understand how to use the digital assistant application or what they need to say next to get the result they desire.

It is with respect to these and other general considerations that examples have been made. Also, although relatively specific problems have been discussed, it should be understood that the examples should not be limited to solving the specific problems identified in the background.

SUMMARY

The disclosure generally relates to technology for improving digital assistant performance by generating and presenting suggestions to users for completing a task or a session. Because users often do not understand the best way to use the digital assistant or what the most popular commands are, the suggestions provide helpful guidance to the user for completing the user's desired task or continuing in a session with the digital assistant. To generate the suggestions, a machine learned language prediction model is trained with features extracted from multiple sources, such as log data representing prior interactions between users and digital assistants. The model may be trained offline. When input is received from a user, the trained machine learned language prediction model is used to determine the most likely suggestion to present to the user to lead to successful task completion. For instance, the suggestion may be in response to the user requesting information or for the digital assistant to perform other tasks. For instance, the machine learned language prediction model may provide a suggestion to the user to perform the most commonly requested subsequent task based on the log data. The suggestion may also be generated in response to the activation of the digital assistant. In generating the suggestion, the machine learned language prediction module may be used to determine intermediate suggestion data, such as a domain, intent, and/or slot, for the suggestion. From the determined intermediate suggestion data for the suggestion, a surface form of the suggestion is generated that can be presented to the user. The surface form of the suggestion is a grammatical, natural language command, phrase, or sentence that the user can understand. The resulting suggestion and related context may further be used to continue training the machine learned language prediction model.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
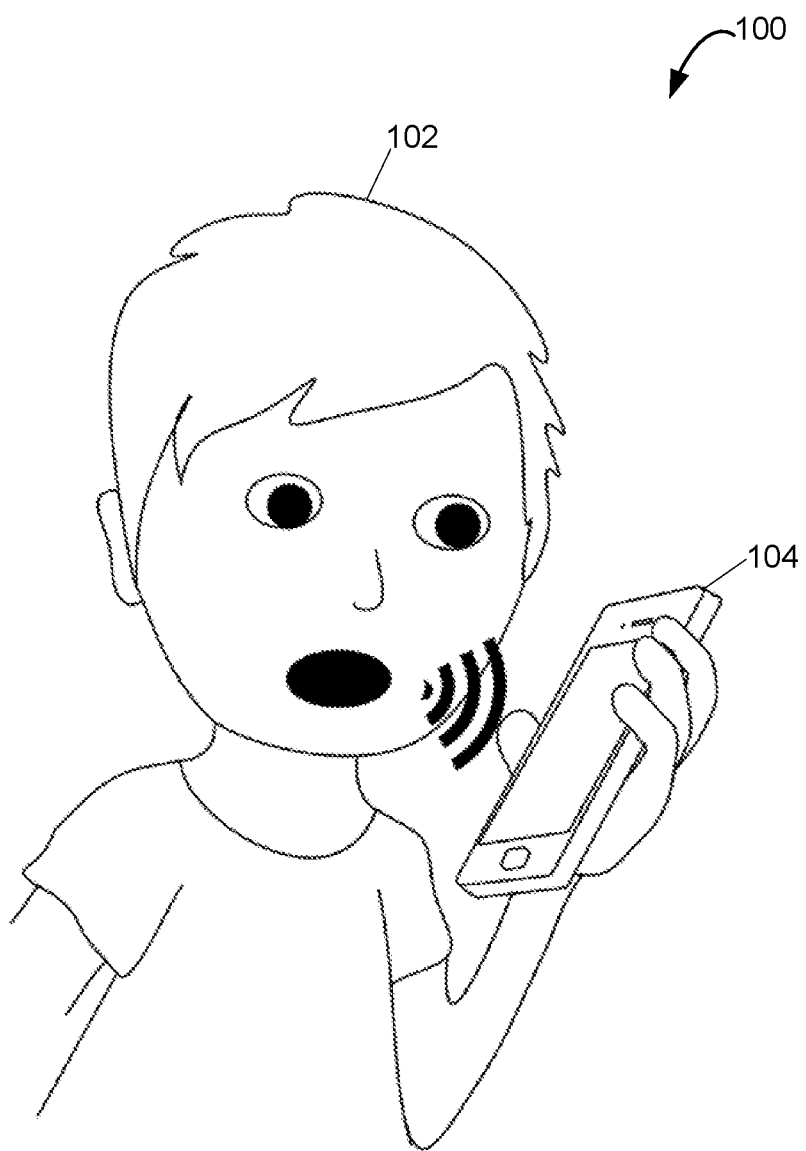
FIG. 1 depicts an environment for receiving input to a client device.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

The present disclosure relates generally to improving the technology behind intelligent digital assistant applications, such as the CORTANA digital assistant application offered by Microsoft Corporation of Redmond, Wash., or the SIRI digital assistant application offered by Apple Incorporated of Cupertino, Calif., hereinafter referred to as "digital assistant". As digital assistants become more advanced and capable of handling more operations, a gap may form between the product developer's view of what the product can do and what end users think the product can do. Users may not understand the boundaries of the digital assistant, and the users may also not understand the depth of knowledge or operations that the digital assistant can use or perform. These problems are exacerbated if multiple user inputs are required to complete a particular task. For instance, when a user asks a digital assistant a question or to perform a task, the user may not understand what types of follow-up questions or tasks can be performed. As another example, if the digital assistant provides an answer or result that the user was not expecting, the user is often unaware how to correct the problem or rephrase the question in a way that causes the digital assistant to provide the expected answer. In complex tasks, such as searching, browsing, and finding a place according to a number of filters, e.g., distance, rating, opening hours, etc., users can easily get confused about what to say to the digital assistant.

As an example multi-turn scenario of interacting with a digital assistant, a user in a first turn may state "Find Chinese restaurants in Bellevue." The digital assistant may respond with five Chinese restaurants that are in Bellevue. The user then may be unaware what he or she can ask in a second turn. For instance, some of the possible statements that user could make include "show me the ones near Lincoln square," "show me high rated ones," "show me the ones open on Monday," "show me the ones that are take-out," "show me driving directions to the 1st one," among many others. It would be unreasonable to display each and every option that the user could select, yet the user needs some type of assistance or suggestion as to what options are available.

Other attempts to address these problems have focused on using discrete rules to handle discrete situations. These efforts, however, can only handle a limited amount of scenarios because a human application developer must develop each rule for any scenario that the human application developer identifies. Identifying specific scenarios and developing discrete rules is time-intensive and cannot be easily or quickly expanded to cover additional scenarios.

The present technology improves the functionality of the digital assistant operations by creating a system for a digital assistant application that is able to provide suggestions to users. The suggestions provide the user with an indication of additional input that the user can provide to the digital assistant. The suggestions may include corrected input from what the user had provided previously entered, or the suggestions may also include further inputs that the user can provide to more fully utilize the functionalities available from the digital assistant application, among other possible suggestions. The suggestions are generated, in part, through the use of a machine learned language prediction model that is trained based on data from previous uses of one or more digital assistant applications. By using a model based on rich data sets from users of digital assistant applications, suggestions for a substantial amount of scenarios can be generated without the need for creating and parsing discrete rules. In addition, the machine learned language prediction model can also handle a larger number of scenarios than could be handled with discrete rules.

As used herein, a turn is an interaction from a user with a digital assistant application during a session. A session includes a conversation (one or more turns from the user with corresponding responses from the digital assistant) between a user and a digital assistant. For instance, the session may start when the digital assistant is activated and end when the digital assistant is deactivated. The session may also begin where the digital assistant detects a request for a task to be performed. A multi-turn scenario is a session where more than one input is received and processed by the digital assistant.

Turning to the figures, FIG. 1 depicts an environment 100 for providing input to a client device. The environment 100 including a user 102 and a client device 104. The client device 104 may be any suitable device, such as those devices described below with reference to FIGS. 7-10. The user 102 in environment 100 can provide input into the client device 104 having a digital assistant via voice input, as shown in FIG. 1. The user 102 may also provide input to the client device 104 through textual input by using a soft-keyboard or other type of text input device. The user may also provide input to the client device 104 through gestures recognized by, e.g., a touch-screen feature, motion detection, or a camera on the client device. Many options for providing input to the client device 104 are known to those having skill in the art and are contemplated here. Upon receiving the input from the user 102, the client device 104, executing a digital assistant application, determines what the user 102 has requested and provides an answer to the user's question or performs the requested tasks. Further, as explained below, the digital assistant generates suggestions to the user based on the context of the interactions with the user. In addition, as also described below, performing the requested tasks may also involve the use of other components, such as network-based services and components.

The environment 100 may change as the user 102 accesses a separate client device such as a laptop computer or personal computer. The environment 100 may also change as the user 102 changes location. For instance, as shown in FIG. 1, the client device 104 may be a mobile device such as a smartphone or a tablet computer system that can be transported to different locations by the user, and the user 102 may desire to use the digital assistant application on the client device 104 in multiple environments. The changes in environments may be measured or determined by the client device 104, which can then be used by a digital assistant application as context when generating suggestions for the user 102. For example, a change in the location of the device may be used as input for generating suggestions.

Figure 2:
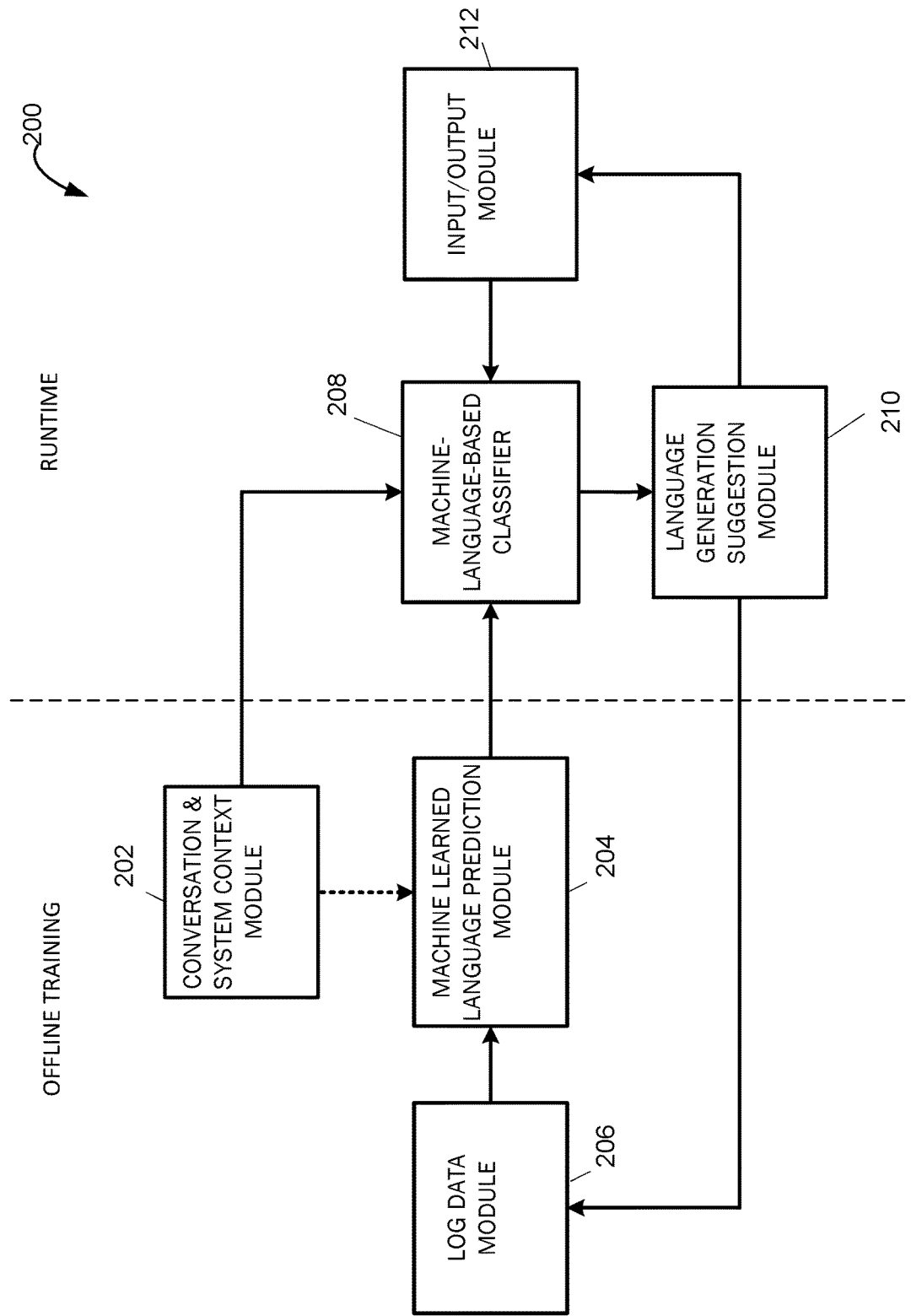
FIG. 2 depicts a system for utilizing contextual language generation with a digital assistant application.

FIG. 2 depicts an example of a system 200 for generating suggestions for a user of a digital assistant. As shown, system 200 includes a conversation and system context module 202, a machine learned language prediction module 204 a log data module 206, a machine-language-based classifier 208, a language generation suggestion module 210, and an input/output module 212. In some examples, each of the components shown in FIG. 2 may be incorporated into a client device, such as client device 104. In other examples, some of the components shown in FIG. 2 may be incorporated into a server that is communicatively connected to a client device having the remainder of the components. In addition, each of the components shown in FIG. 2 may be incorporated into a digital assistant or used in conjunction with a digital assistant. As used herein, "modules" include hardware, software, or a combination of hardware and software configured to perform the processes and functions described herein. In addition, as used herein, an "application" comprises instructions that, when executed by one or more processors, performs processes and functions described herein.

The log data module 206 accesses data from previous interactions between users and digital assistant applications. The interactions may be specific to a particular user or may be from the interactions of multiple users with multiple digital assistant applications. The log data contains a rich set of data that may include any information that could affect the performance of a task by a digital assistant application. For example, the log data may include information such as device identifications, the location of the device during the interaction, the questions, responses, and inputs during a previous session, items being displayed or otherwise output during the session, contacts referenced, calendar information referenced, the time of the session, along with any other information about a previous session or state of the client device during the session. The log data may also include information, such as click-through rates, regarding the user's interactions with the responses provided by the digital assistant application. In addition, the log data may also include all the operations that the user has performed with the client device during a particular time period, such as within a day. In some examples, the data items included in the log data are also considered inputs to a digital assistant when processing a request in a current session as well. The log data module 206 provides the log data to the machine learned language prediction module 204. In some cases, the log data module 206 also formats the log data into a format that is usable by the machine learned language prediction module 204.

The machine learned language prediction module 204 develops, based at least in part on the log data received from the log data module 206, a machine learned language prediction module for use in generating suggestions for a user using a digital assistant. The machine learned language prediction model may be developed with a multitude of statistical machine learning based techniques. In some examples, the machine learned language prediction module 204 develops the machine learned language prediction model as an artificial neural network, Bayesian classifier, genetically derived algorithms, or any other machine learning models available to those having skill in the art. For instance, the machine learned language prediction model may generate a probability distribution across different suggestions. In examples, the machine learned language prediction model generates a probability distribution across some or all of the domains, intents, and/or slots that the digital assistant is capable of handling.

The machine learned language prediction model is trained with features extracted from sources including, but not limited to, previous user queries (e.g., word/phrase ngram features) in the session, previous domain, intent, and slots assigned to the previous queries, as well as session context such as turn number. The features may also include user specific history or personalization features. Additional features are also extracted from system response and results, such as a list of restaurants, movies, people, etc., depending on the user's request in a given domain. All of these features may be defined collectively as the context features. These features are aggregated across all or a subset of the log data and used to train the machine learned language prediction models. Model training is typically done offline, and during runtime the context features are computed and entered into a decoder or module, such as the machine-language-based classifier 208, that uses the trained model to determine the most likely suggestion presented to the user for task completion or a successful session. However, model training may also be done at runtime to continuously update the model. As used herein, a task may include requests for information or queries to the digital assistant.

In some cases, the machine learned language prediction module 204 provides the generated machine learned language prediction model to the machine-language-based classifier 208. In other cases, the machine learned language prediction module 204 may provide access to the machine-language-based classifier 208 in order to allow the machine-language-based classifier 208 to utilize the trained machine learned language prediction model.

The machine learned language prediction module 204 may also generate and train the predictive model based on data received from the conversation and system context module 202. The conversation and system context module 202 provides user context and session data signals to the machine learned language prediction module 204. For instance, the conversation and system context module 202 provides a user profile or session specific information that may be useful in generating a predictive model. The user profile may include information about a particular user along with information about the settings on a particular device. The information about the user and the settings of the device both may have an impact on how the digital assistant performs a particular task. The information about the user and the settings of the device also provide additional context into the user's preferences. In some examples, the data and information provided to the machine learned language prediction module 204 from the conversation and system context module may be substantially embodied in the log data received from the log data module 206. In those examples, it may not be necessary for the machine learned language prediction model to receive data from the conversation and system context module 202.

The machine-language-based classifier 208 utilizes the machine learned language prediction model to generate intermediate suggestion data, such as a set of a domains, intents, and slots, for generating a suggestion to present to the user. The suggestion may suggest to the user a subsequent task that the digital assistant can complete for the user. The machine-language-based classifier 208 receives at least some of the same types of inputs that were used by the machine learned language prediction module 204 to generate the predictive model. As discussed above, the machine-language-based classifier 208 receives information from the conversation and system context module 202, such as a context for the user. The information received from the conversation and system context module 202 may be the same information provided to the machine learned language prediction module 204. Input received at a client device from a user is also provided to the machine-language-based classifier 208.

In addition, the machine-language-based classifier 208 may also process the input received from the user requesting the digital assistant perform a task. In processing the user input, the machine-language-based classifier analyzes the user input to determine intermediate task data, such as a domain, intent, and slot, corresponding to the first task. In addition to the context for the user, that intermediate task data corresponding to the first task may also be input to the machine learned language prediction model to generate the intermediate suggestion data for generating the suggestion.

Figure 3:
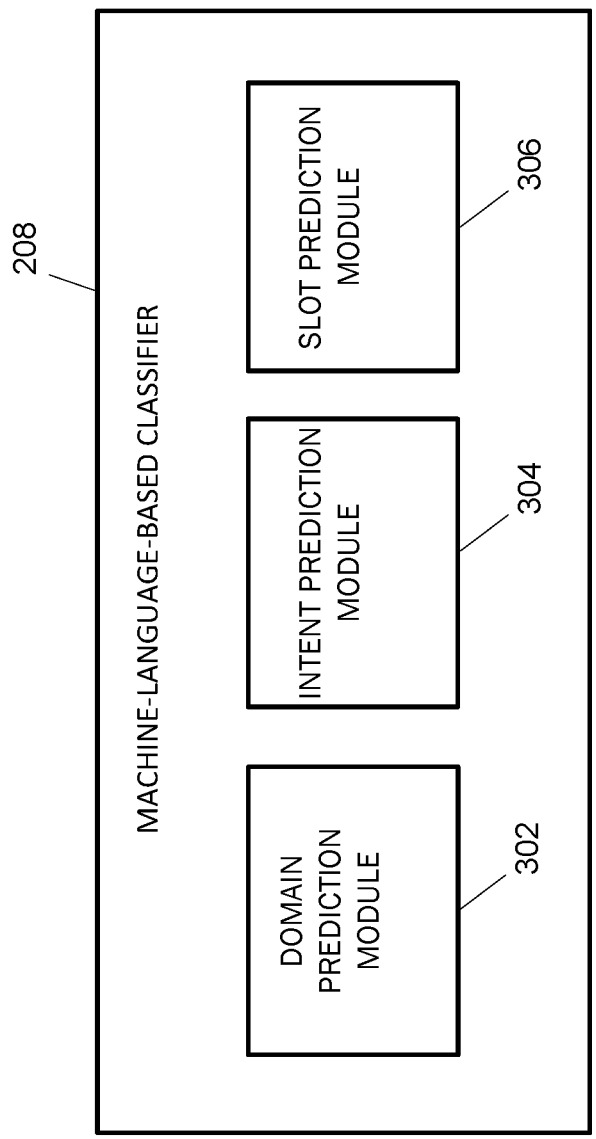
FIG. 3 illustrates an example of a machine-language-based classifier.

Turning to FIG. 3, in examples, the machine-language-based classifier 208 may have a domain prediction module 302, an intent prediction module 304, and a slot prediction module 306. The domain prediction module 302 predicts a domain to be included as part of a suggestion. A domain may be considered a general category or container within the present framework. For example, there may be a domain for "places" and a domain for "calendar." With those examples, the places domain may relate to tasks such as getting directions for finding particular places, such as restaurants or stores. The calendar domain may relate to date-based tasks, such as setting reminders or appointments. Based on the inputs to the machine-language-based classifier 208, the domain prediction module 302 predicts a most likely domain for a suggestion to the user. The domain prediction module 302 utilizes at least a component of the machine learned language prediction model generated by machine learned language prediction module 204. The domain prediction module 302 also may utilize input from the input/output module 212 and the data received from the conversation and system context module 202.

The intent prediction module 304 predicts an intent to be included as part of a suggestion. An intent may be considered an action to be performed. In some examples, within the present framework, each domain may have a multitude of intents relating to the particular domain. For example, within the places domain, there may be an intent for "get_directions." Based on the inputs to the machine-language-based classifier 208, the intent prediction module 304 predicts a most likely intent for a suggestion to the user. The intent prediction module 304 utilizes at least a component of the machine learned language prediction model generated by machine learned language prediction module 204. The intent prediction module 304 also may utilize input from the input/output module 212 and the data received from the conversation and system context module 202.

The slot prediction module 306 predicts a slot or slots to be included as part of a suggestion. A slot may be considered a filter or an entity. Slots, however, can be more than entities. A slot may be considered an argument for a function or call that can be used to complete a task or answer a query. For instance, a city, state, or other location may be slot value for a task of finding directions or finding a store in particular location. When searching for a restaurant, the type of cuisine, hours of operation, whether the restaurant has a bar, etc. may all be considered slots. Similarly, another slot could be the location of the restaurant or whether the restaurant is near a particular city. The slot prediction module 306 utilizes at least a component of the machine learned language prediction model generated by machine learned language prediction module 204. The slot prediction module 306 also may utilize input from the input/output module 212 and the data received from the conversation and system context module 202.

Returning to FIG. 2, the language generation suggestion module 210 receives the intermediate suggestion data for generating the suggestion, such as one or more predicted domains, intents, and slots from the machine-language-based classifier 208. Based on the predicted intermediate suggestion data, the language generation suggestion module 210 generates a suggestion to be presented to the user. In generating the suggestion to be presented to the user, the language generation suggestion module 210 determines a surface form of the suggestion based on the intermediate suggestion data, such as the one or more predicted domains, intents, and slots. A surface form of a suggestion is a form that is recognizable and understandable to the user. For instance, the surface form of a suggestion to get driving directions to a location may be "You can get driving directions to any business, just say it."

Once the language generation suggestion module 210 generates the surface form of the suggestion, the surface form of the suggestion is presented to the input/output module 212, which presents the suggestion to the user. The suggestion may be presented to the user in any form available by the client device of the user. For example, the suggestion may be presented visually on a screen or audibly through a speaker. The language generation suggestion module 210, in conjunction with the machine-language-based classifier 208, may also utilize the machine learned language prediction model generated by the machine learned language prediction module 204.

As an example, because the machine learned language prediction model is based off of previous interactions with users of a digital assistant, the suggestion may be based on the most likely follow-up input provided during past interactions or sessions. For instance, if a user first asks "Find a home improvement store," the digital assistant application determines the intent of the request to be "find_place." That intent and the context for the user is provided as input to the machine learned language prediction model, which determines the most likely follow-up input. For example, if 40% of the time, as exposed through use of the machine learned language prediction model, the "find_place" intent is followed by the "get_direction" and 20% of the time it is followed by "get_store_hours" intent, the language generation suggestion module 210 and the machine-language-based classifier 208 dynamically generate suggestions according to these probabilities to guide the user toward additional task completion.

Each of the generated suggestions and interactions with the user may also be included in the log data and reintroduced into the machine learned language prediction module 204 to continuously update the machine learned language prediction model based on the most recent interactions, effectively creating a feedback loop. For instance, as shown in FIG. 2, the language generation suggestion module 210 provides the generated suggestion to the log data module 206. The language generation suggestion module 210 may also provide additional data, such as the user input and the intermediate suggestion data, such as the predicted domains, intents, and slots for the suggestion, to the log data module 206.

The functionality of the modules depicted in FIG. 2 may also be performed either offline or during runtime. For instance, as shown in FIG. 2, the log data module 206, the machine learned language prediction module 204, and the conversation and system context module 202 may all perform their functions offline. The log data module 206 may gather and organize the log data offline to conserve or best utilize resources. Similarly, the machine learned language prediction module 204 may also generate the machine learned language prediction model offline. The conversation and system context module 202 may also organize some data offline. In some examples, the conversation and system context module 202 operate during runtime to collect information about the present session or conversation between the user and the digital assistant application.

The machine-language-based classifier 208 operates during runtime to utilize the machine learned language prediction model to generate intermediate suggestion data for generating a suggestion, including predicting the domains, intents, and slots for the suggestion based on the inputs discussed above. Similarly, the language generation suggestion module 210 also operates during runtime to generate the surface of the suggestion. The input/output module 212 also operates during runtime to receive input from the user and to provide output to the user. The machine learned language prediction module 204 may also operate at runtime to continuously update the machine learned language prediction model with additional log data.

Figure 4:
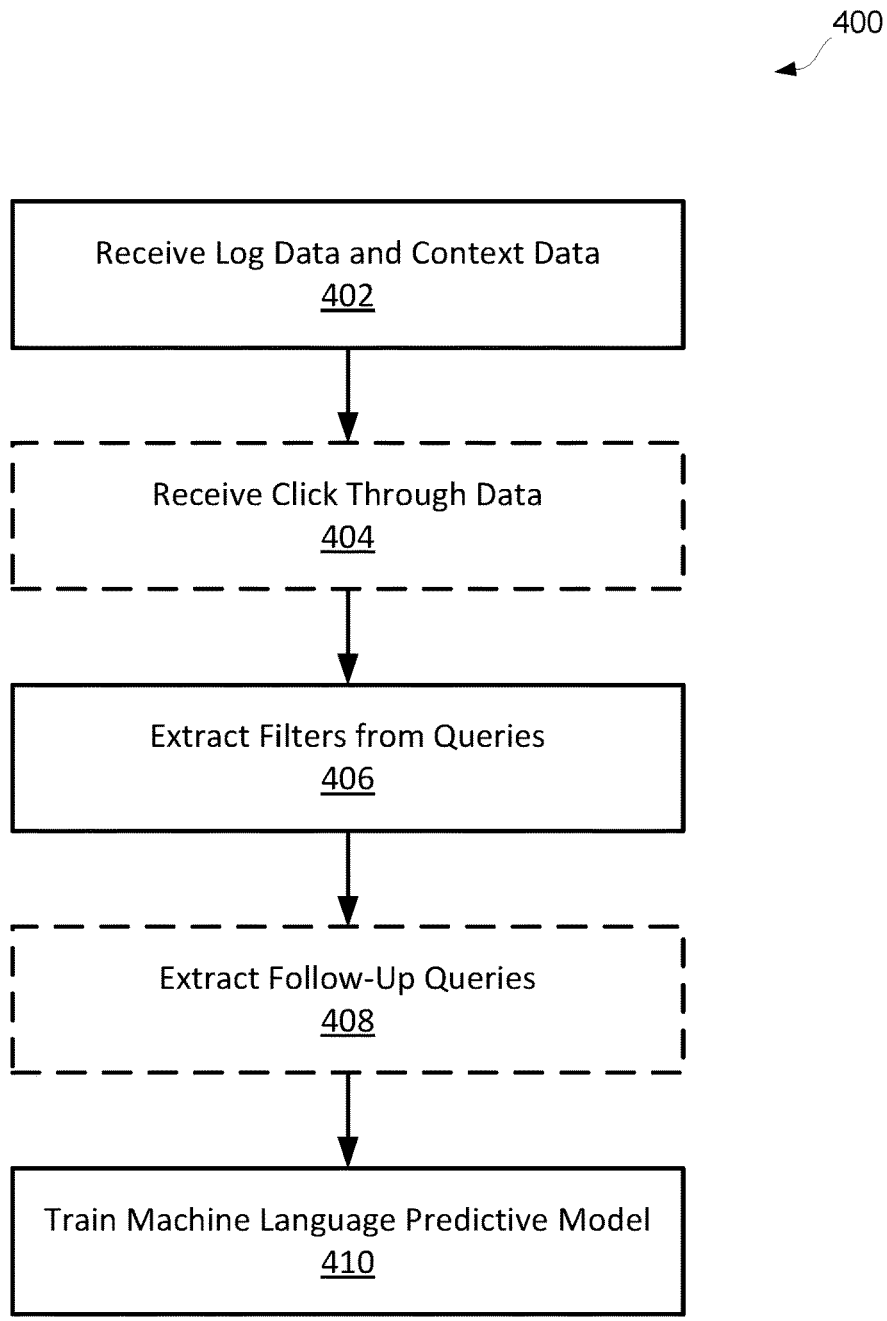
FIG. 4 depicts a method for generating a machine learned language prediction model for use in a digital assistant.

FIG. 4 depicts a method 400 for generating a machine learned language prediction model for use in a digital assistant. While the methodologies herein are shown and described as being a series of acts that are performed in a sequence, it is to be understood and appreciated that the methodology is not limited by the order of the sequence. For example, some acts can occur in a different order than what is described herein, as will be appreciated by those skilled in the art. In addition, some acts can occur concurrently with another act. Further, in some instances, not all acts may be required to implement a methodology described herein. Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable device, displayed on a display device, and/or the like.

At operation 402, log data is received. The log data includes historical data representing previous interactions between one or more users and one or more digital assistant applications, and may specifically include the types of data discussed above. As also discussed above, the log data is used to train a model to reveal patterns of interactions with digital assistant applications. At operation 404, click through data is received. The click through data represents selections of a user in previous sessions or interactions. In some examples, the click through data is incorporated in the log data, and therefore the click through data need not be separately received in operation 404.

At operation 406, the log data, and the click through data where included, are analyzed to extract filters from previous queries in the log data. Input received from users to a digital assistant application may generally be considered requests to complete tasks, such as queries or requests for information. While discussed as queries or tasks herein, the technology is equivalently applicable to user input requesting any actions or information from the digital assistant, which may be considered generally as requests for tasks. The filters, or in some examples slots, are extracted from the query to determine the frequent filters that provided by the users. Extracting the filters from the queries or requests may also assist in revealing the underlying intents of the requests or queries.

At operation 408, follow-up queries are also extracted from the log data and the click through data. The follow-up queries are generally only available in multi-turn scenarios where the user has provided multiple inputs. The follow-up queries reveal patterns of the inputs from the user based on the responses that were presented to the user by a digital assistant application. For example, patterns may be revealed that 40% of the time users request directions to a place after searching for that place.

At operation 410, a machine learned language prediction model is trained or generated based on at least the log data and the click through data along with the extracted filters and follow-up queries, where available. As will be appreciated by those having skill in the art, the machine learned language prediction model may be of many different types that can be trained using data containing inputs and outputs. For instance, the machine learned language prediction model may be a neural network, a statistical regression model, or support vector machines (SVMs). The machine learned language prediction model is used to expose the patterns that exist in the log data and the click through data. These patterns may often be based on the interactions with the user, such as frequently requested tasks, frequently asked queries, types of filters frequently used with particular tasks or queries, along with many other patterns and relationships between inputs and outputs that can be revealed by utilizing a machine learned language prediction model.

The machine learned language prediction model may also be based on intermediate task data, such as the domains, intents, and slots that correspond to the tasks, queries, or other inputs in the log data. The domains, intents, and slots may be explicitly included in the log data or may be extracted during the method 400 to be used in training the machine learned language prediction model. In some examples, multiple predictive models may be trained or generated. For instance, a first predictive model may be generated for domains, a second predictive model may be generated for intents, and a third predictive model may be generated for slots.

Figure 5:
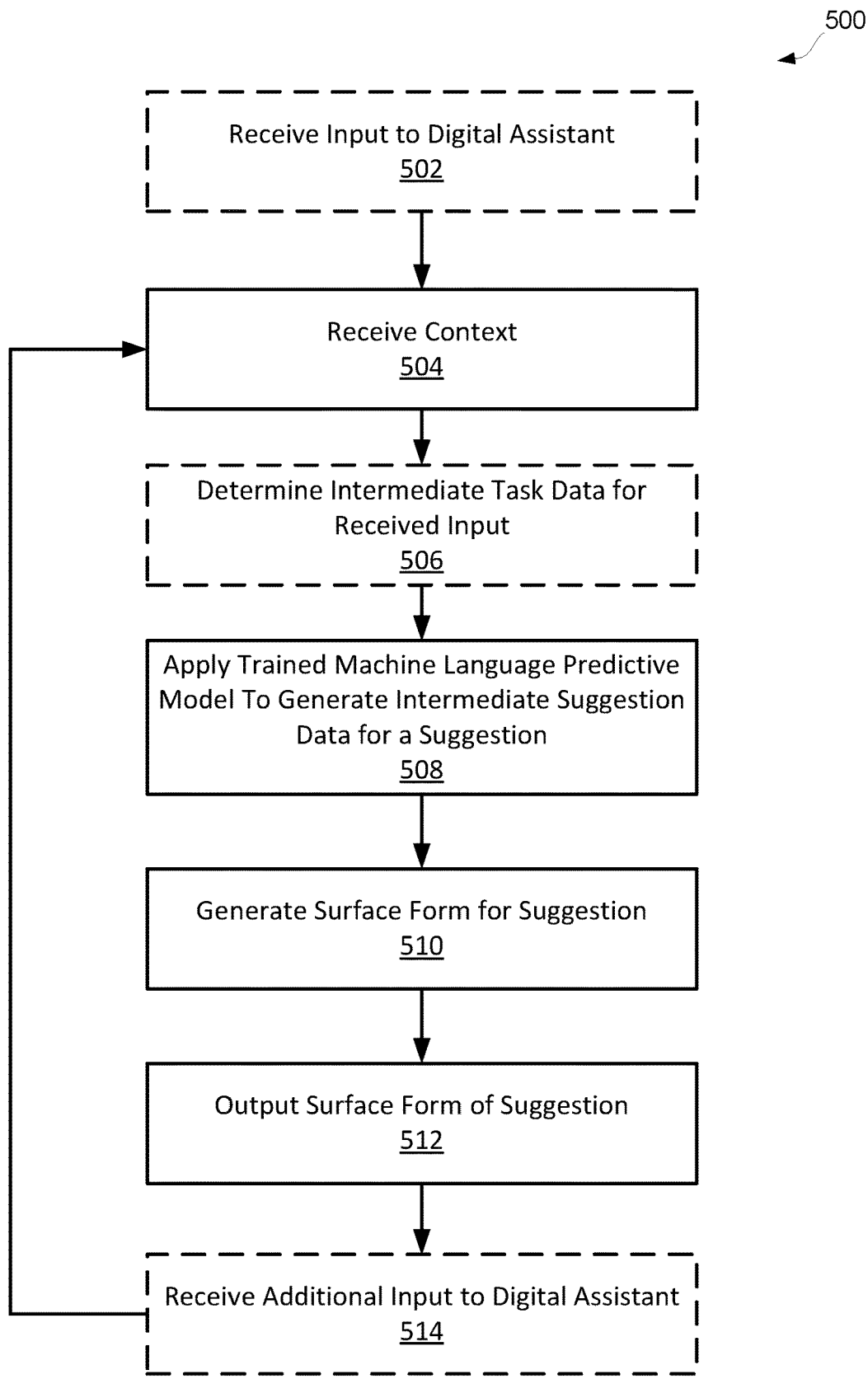
FIG. 5 depicts a method for generating a suggestion in a digital assistant.

FIG. 5 depicts a method 500 for generating a suggestion for a user in a digital assistant. At operation 502, input is be received by a digital assistant. In examples where the user is initiating a first turn, the user will provide input requesting the digital assistant to perform a task. In some examples, however, a suggestion may be generated prior to a user providing any requests or queries to the digital assistant application at operation 502. For example, method 500 may be triggered or started upon the user activating the digital assistant prior to the user providing any queries or requests. In such cases, the input received in operation 502 is an input activating the digital assistant. In that example, a suggestion may be presented to the user prior to receiving any input from the user. In such an example, the suggestion may be generated using the machine learned language prediction model to predict the most likely first input into a digital assistant.

At operation 504, context is received. Context includes a broad amount of data, including data about the current session and context about the user and the client device. For instance, the context may include much of the same data that was used to train the machine learned language prediction model, such as the data in the log data and the click through data. The context may include a user profile or session specific information that can be used as input to the machine learned language prediction model to predict intermediate suggestion data for generating a suggestions, such as domains, intents, and slots to be used in generating a suggestion. The user profile includes information about a particular user, and in some examples, information about the settings on a particular device. The information about the user and the settings of the device both may have an impact on the suggestion that is generated. The information about the user and the settings of the device also provide additional insight into the user's preferences. Accordingly, different suggestions may be generated based on the context, even where the recent input from the user is the same.

At operation 506, in examples where user input is received, intermediate task data corresponding to the requested task, such as domain, intent, and slots for the received input, is determined. The domains, intents, and slots assist in classifying and identifying the particular task or query that the user has requested. Based on the determined domains, intents, and slots, the digital assistant application may also perform the requested task or respond to the query at operation 506.

At operation 508, a trained machine learned language prediction model is applied to determine intermediate suggestion data for generating a suggestion for the user. In examples, the intermediate suggestion data includes a domain, intent, and/or slot for a suggestion to be presented to the user. The trained machine learned language prediction model may be a predictive model trained at operation 410 of method 400 or the predictive model generated by the machine learned language prediction module 204 in system 200. The machine learned language prediction model is applied by providing as inputs to the machine learned language prediction model the context for the user identified in operation 504 and the intermediate task data, where available, determined in operation 506. The machine learned language prediction model receives and analyzes the inputs to generate intermediate suggestion data, such as domains, intents, and/or slots, for generating a suggestion. In some examples, only a domain, intent, or slot need be generated by the machine learned language prediction model in operation 508. In other examples, a combination of a domain, intent, and/or slot is generated in operation 508. The trained predictive model determines the most likely domain, intent, and/or slot for a suggestion based on the data from which the model was trained. For instance, if the model determines that the best suggestion for the user does not need to include a slot, the slot may not be determined or generated. As an example, if upon activation of the digital assistant, the predictive model determines that most users ask about the weather, particular slots or filters need not be determined to generate and present a suggestion to the user to ask about the weather.

Based on the intermediate suggestion data for generating a suggestion, a surface form for the suggestion is generated at operation 510. The surface form of the suggestion is a form that is recognizable and understandable to the user. For instance, if the predicted domain for the suggestion is "places," the predicted intent for the suggestion is "get_directions," and the predicted slot for the suggestion is "Microsoft Headquarters," the user would likely not understand a presentation of that data alone. Rather, it is useful to present that information in a form that the user can understand, i.e., a surface form. In the above example, the surface form may be "You can ask for directions to Microsoft Headquarters." Such a suggestion may be generated and presented after the user had provided the input of "Find Microsoft Headquarters" and the digital assistant had returned the location of Microsoft Headquarters.

In some examples, multiple suggestions may be generated. For instance, if the machine learned language prediction model determines that an intent for getting directions has the highest probability for being requested next, and a request for getting weather information has a second highest probability, two suggestions may be generated—one for directions and one for weather. Where two suggestions are generated, two surface forms may be generated. In other examples, a combined surface form including both suggestions may be generated.

At operation 512, the surface form of the suggestion generated in operation 510 is output to the user via the client device. The surface form of the suggestion may be presented in a multitude of ways, including visually through a display screen or audibly through a speaker.

Once the user has seen the suggestion, the user will likely follow the suggestions and provide additional input to the digital assistant requesting the digital assistant to perform the suggested task. The additional input from the user is received at operation 514. The additional input from the user is then handled in a similar manner to that of initial input. For example, operations 504-514, or a subset thereof, may be repeated for the additional input. The context received in operation 504, however, may additionally include the input and response from the previous turn in the session or may have changed in other ways, including the location of the user. In completing operations 504-514 for the additional input, a second suggestion may be presented to the user.

Figure 6:
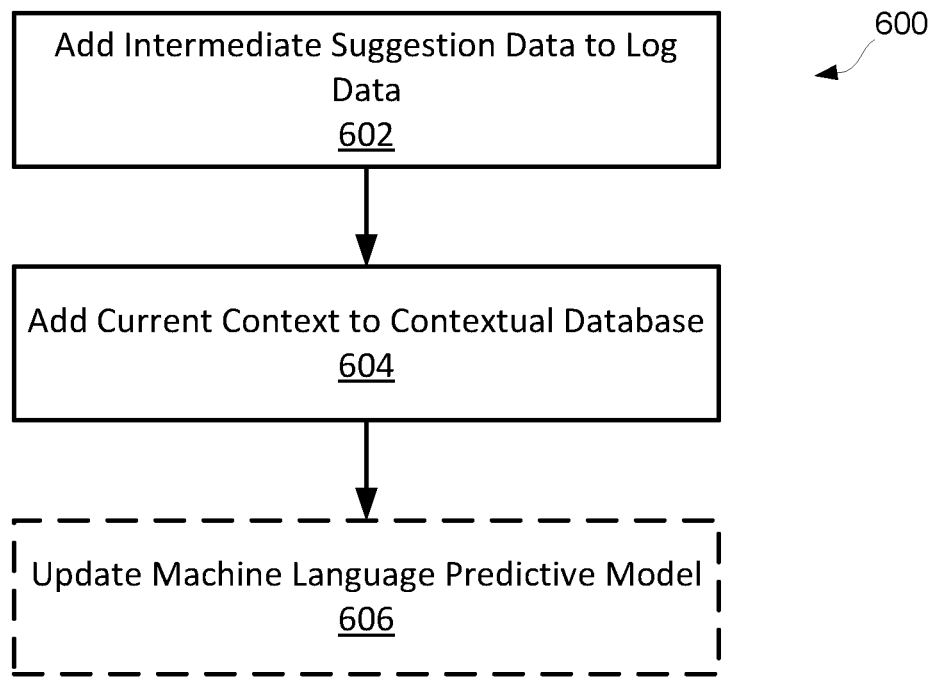
FIG. 6 depicts a method for updating a machine learned language prediction model for use in a digital assistant.

FIG. 6 depicts a method 600 for updating a machine learned language prediction model for use in a digital assistant application. At operation 602, log data is updated by adding the intermediate suggestion data for generating the suggestion, such as the domain, intent, and/or slot that were utilized in generating a suggestion for the user, as generated in method 500. The surface form of the suggestion may also be added to the log data. At operation 604, the current context for which the suggestion was based is also added to a contextual database. In some examples, the context may be added directly to the log data rather than a separate contextual database. At operation 606, the machine learned language prediction model used to determine the suggestion is updated based on the updated log data and context in the contextual database. Updating the predictive model may be completed by performing method 400 with the updated log data and context data. By updating the machine learned language prediction model based on the generated suggestions and the underlying intermediate suggestion data, including the domains, intents, and/or slots for generating the suggestion, a feedback loop is created that continuously improves the effectiveness of the machine learned language prediction model.

As an illustration of the methods presented herein, take for example a user that purchases a new device having digital personal assistant. The user has a goal or task in mind, but the user does not understand what the digital assistant can do or how to properly express the request. For instance, assume the user has just moved to Washington and does not know the area. The user has a goal in mind of getting driving directions to Microsoft headquarters. The user initializes the digital assistant and in a first turn states "Microsoft headquarters." The digital assistant processes the input and returns the location of Microsoft headquarters. The user often does not know what to say next. Thus, the technology herein is able to predict a suggestion for the user based on previous interactions from the user and other users with digital assistants. The technology predicts a most likely subsequent task, and generates intermediate suggestion data, such as a domain, intent, and/or slot, for a suggestion for the subsequent task to present to the user. Based on the machine learned language prediction model trained on log data, a probability distribution across multiple intents may reveal that a request for a place is most often followed by a request for directions to that place. In such a scenario, a suggestion such as "I can get you directions to Microsoft headquarters, would you like me to do that?", can be presented to the user. The user then understands that the digital assistant is capable of getting directions, and can provide additional input to have the digital assistant get directions to Microsoft headquarters.

As another illustration, a user may not understand the extent of the domains that are supported by a digital assistant or whether the digital assistant is capable of carrying over context from a previous request. For instance, take a user who wants to drive to the Microsoft Store in Denver, Colo. In a first turn, the user states "Find Microsoft Store in Denver." The digital assistant processes the request and provides a location of the Microsoft Store. The user again may not know what capabilities of the digital assistant are available. Similar to the above illustration, the present technology is capable of presenting a suggestion to the user of follow-up inputs that the user may provide. Depending on probabilities determined by the machine learned language prediction model, the digital assistant may output a suggestion to the user that states "You can also check the weather there." By presenting this suggestion, the user is now aware that another domain may be accessed and the context of "Denver" will be carried over to the next request. Multiple suggestions may also be created and presented to the user. For instance, if the machine learned language prediction model determines that users often request the hours for a store after requesting the location of the store, a secondary suggestion may also be presented suggesting to the user suggesting to the user that the store hours may be requested. In such cases, the suggestions may be combined into a single surface form such as, "You can also check the weather there or ask for the hours of operation for the Microsoft store."

Figure 7:
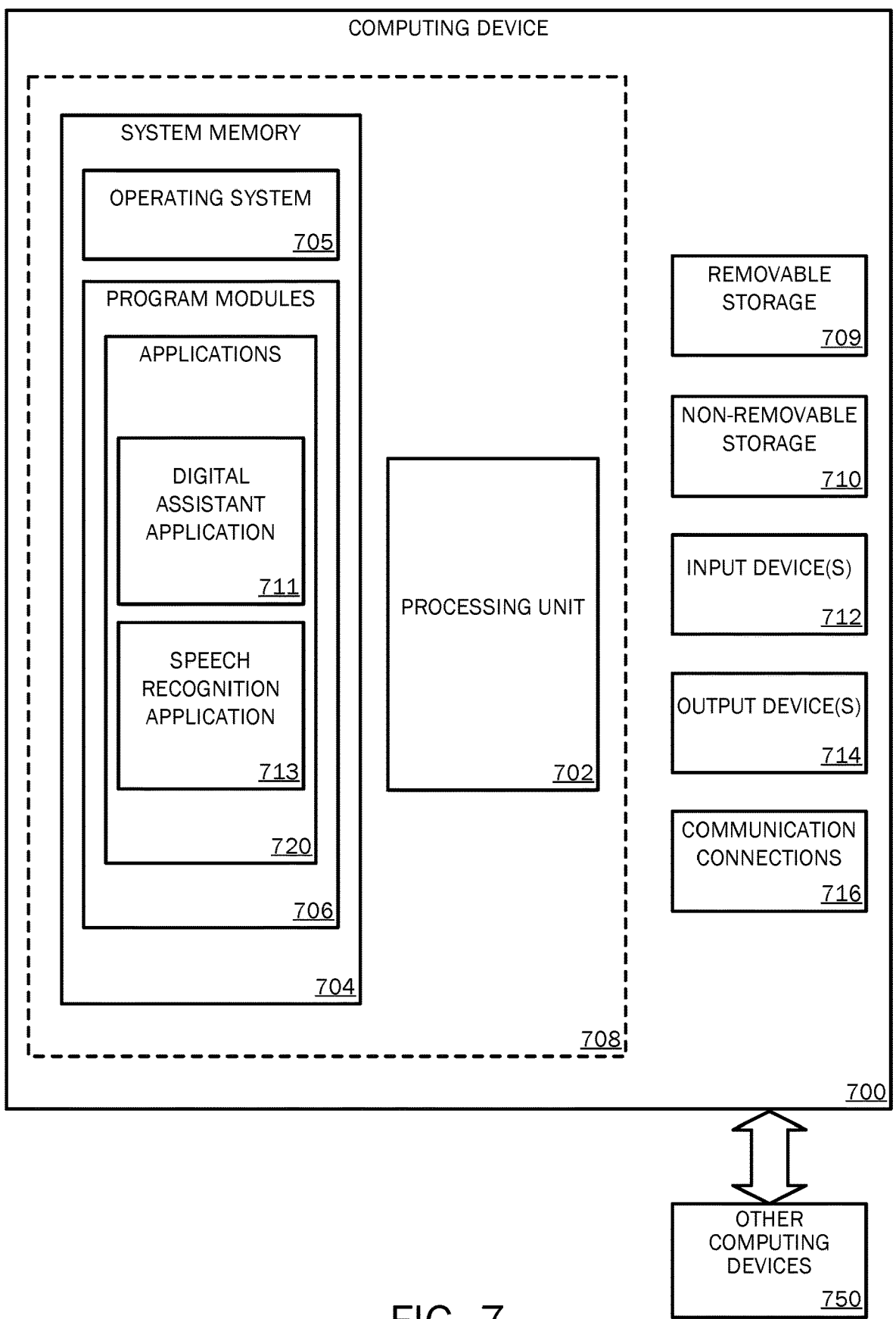
FIG. 7 is a block diagram illustrating example physical components of a computing device with which examples of the disclosure may be practiced.

FIG. 7 is a block diagram illustrating physical components (e.g., hardware) of a computing device 700 with which examples of the disclosure may be practiced. The computing device components described below may have computer executable instructions for a speech recognition application 713, e.g., of a client or server and/or computer executable instructions for digital assistant application 711, e.g., of a client or server, that can be executed to employ the methods disclosed herein. Digital assistant 711 may be on a client device such as client device 104. Components of the digital assistant 711 may also be on a server. Similarly, speech recognition application 713 may be on a server. Speech recognition application 713, or components thereof, may also be on a client device, such as client device 104. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such digital assistants as discussed with regard to FIGS. 1-6. The operating system 705, for example, may be suitable for controlling the operation of the computing device 700. Furthermore, examples of the disclosure may be practiced in conjunction with a graphics library, audio library, speech database, speech synthesis applications, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., digital assistant 711 or speech recognition application 713) may perform processes including, but not limited to, the examples as described herein. Other program modules that may be used in accordance with examples of the present disclosure, and in particular to generate screen content and audio content, may include electronic mail and contacts applications, word processing applications, spreadsheet applications, database applications, slide presentation applications, drawing, messaging applications, mapping applications, speech-to-text applications, text-to-speech applications, and/or computer-aided application programs, intelligent assistant applications, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. Such input devices may be utilized in conjunction with input/output module 212. The output device(s) 714 such as a display, speakers, a printer, etc. may also be included. Such output devices may be utilized in conjunction with input/output module 212. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal. Computer storage media may be stored, incorporated into, or utilized in conjunction with computer storage devices.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
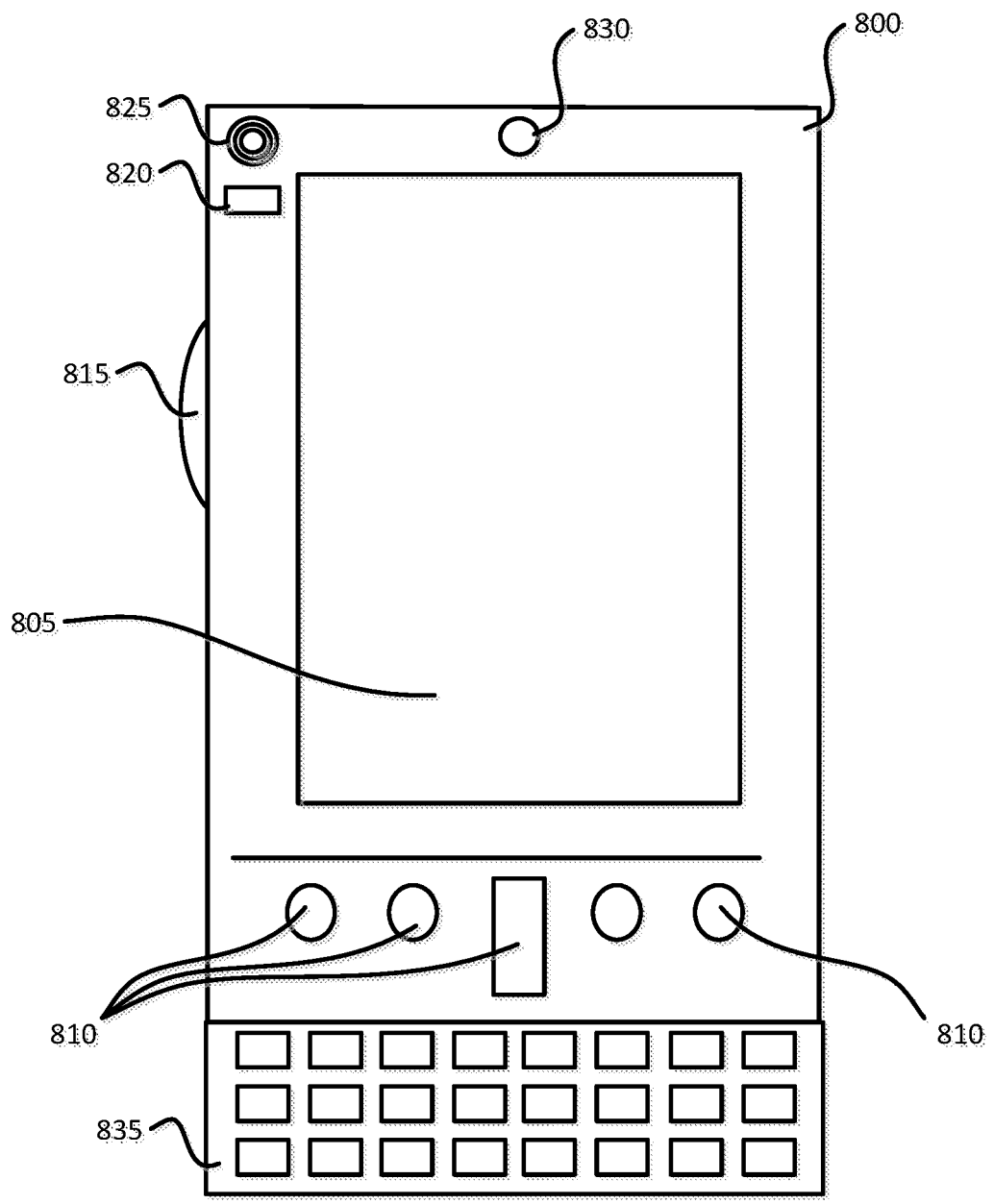
FIGS. 8A and 8B are simplified block diagrams of a mobile computing device with which examples of the present disclosure may be practiced.
Figure 8B:
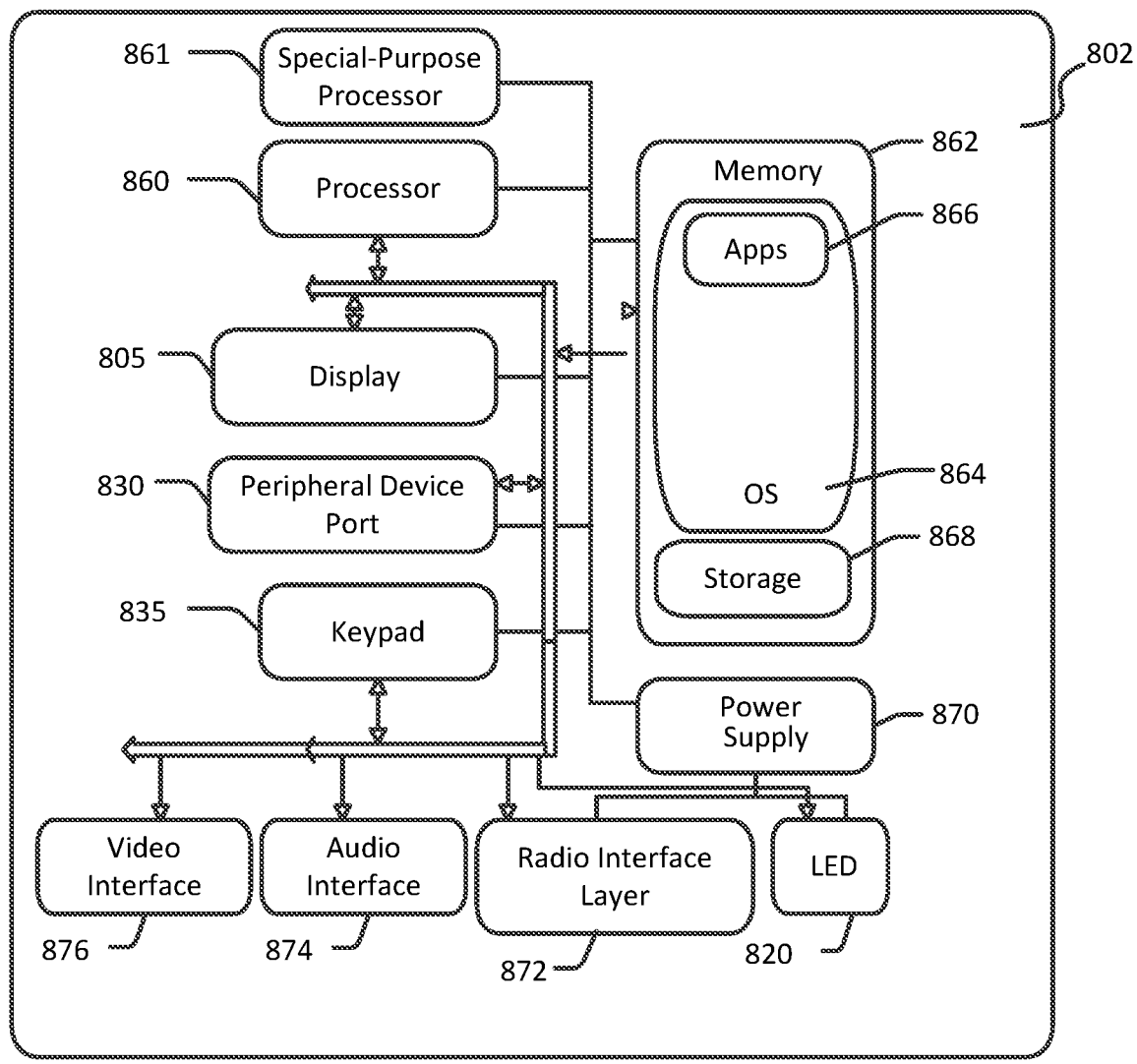

FIGS. 8A and 8B illustrate a mobile computing device 800, for example, a mobile telephone, a smart phone, wearable computer (such as a smart watch), a tablet computer, a laptop computer, and the like, with which examples of the disclosure may be practiced. In some examples, the client may be a mobile computing device. With reference to FIG. 8A, one example of a mobile computing device 800 for implementing the examples is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative examples, mobile computing device 800 may incorporate more or less input elements. For example, the display 805 may not be a touch screen in some examples. In yet another alternative example, the mobile computing device 800 is a portable phone system, such as a cellular phone. The mobile computing device 800 may also include an optional keypad 835. Optional keypad 835 may be a physical keypad or a "soft" keypad generated on the touch screen display. In various examples, the output elements include the display 805 for showing a graphical user interface (GUI), a visual indicator 820 (e.g., a light emitting diode), and/or an audio transducer 825 (e.g., a speaker). In some examples, the mobile computing device 800 incorporates a vibration transducer for providing the user with tactile feedback. In yet another example, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one example of a mobile computing device. That is, the mobile computing device 800 may incorporate a system (e.g., an architecture) 802 to implement some examples. In one example, the system 802 is implemented as a "smart phone" capable of running one or more applications (e.g., browser, e-mail, calendaring, contact managers, messaging clients, games, text-to-speech applications, and media clients/players). In some examples, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, text-to-speech applications, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions to generate suggestions with a digital assistant application.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation or capture speech for speech recognition. In accordance with examples of the present disclosure, the microphone may also serve as an audio sensor to facilitate control of notifications. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

Figure 9:
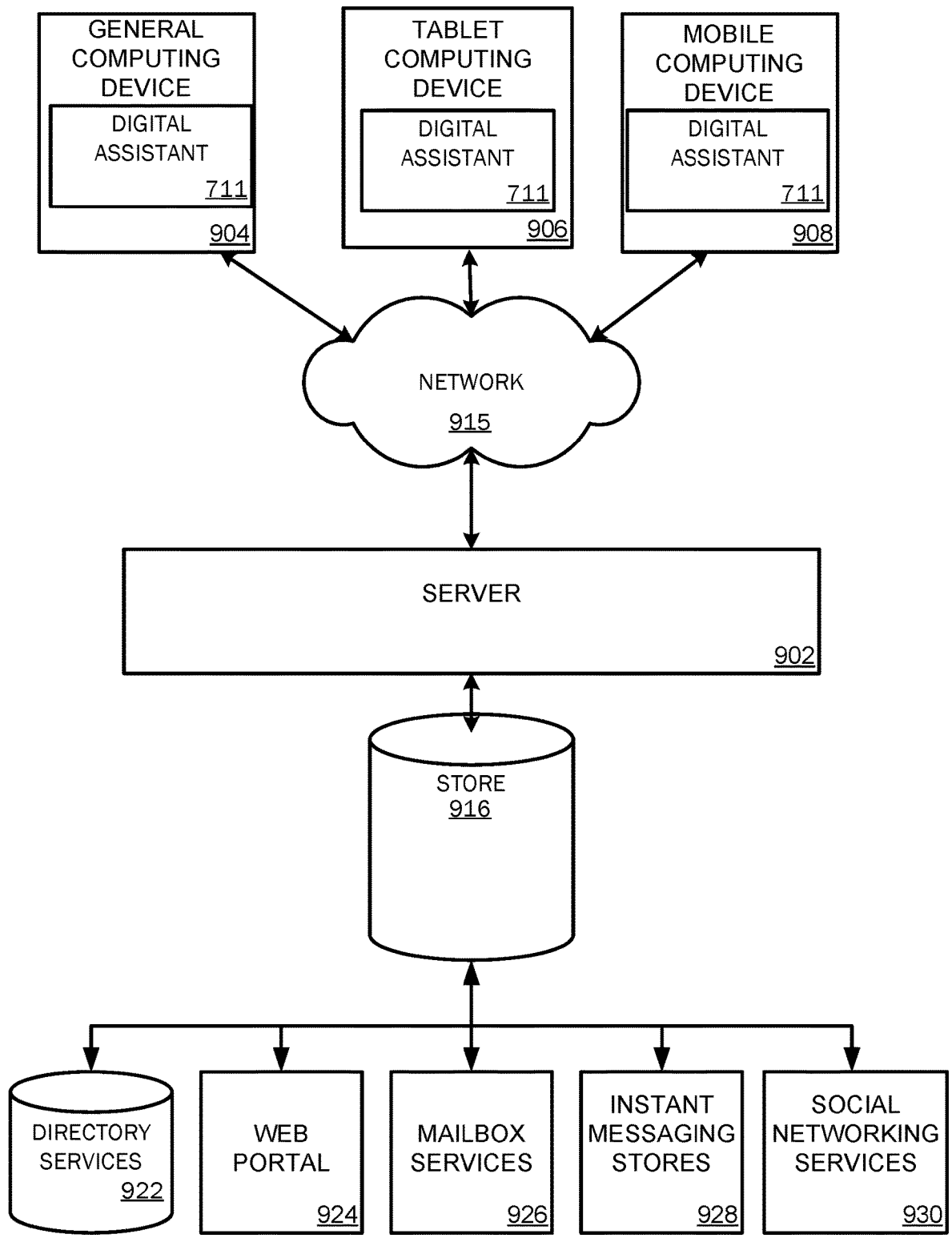
FIG. 9 is a simplified block diagram of a distributed computing system in which examples of the present disclosure may be practiced.

FIG. 9 illustrates one example of the architecture of a system for processing data received at a computing system from a remote source, such as a computing device 904, tablet 906, or mobile device 908, as described above. Content displayed at server device 902 may be stored in different communication channels or other storage types. For example, various documents may be stored using a directory service 922, a web portal 924, a mailbox service 926, an instant messaging store 928, or a social networking site 930. The digital assistant 711 may be employed by a client who communicates with server 902. The server 902 may provide data to and from a client computing device such as a personal computer 904, a tablet computing device 906 and/or a mobile computing device 908 (e.g., a smart phone) through a network 915. Components of the digital assistant 711 may also reside on the server 902. For instance, the machine-language-prediction module 204 and log data module 206 may reside on server 902. In some examples, the machine-language-based classifier 208 and the language generation suggestion module 210 may also reside on server 902. By way of example, the computer system described above may be embodied in a personal computer 904, a tablet computing device 906 and/or a mobile computing device 908 (e.g., a smart phone). Any of these examples of the computing devices may obtain content from the store 916, in addition to receiving graphical data useable to be either pre-processed at a graphic-originating system, or post-processed at a receiving computing system.

Figure 10:
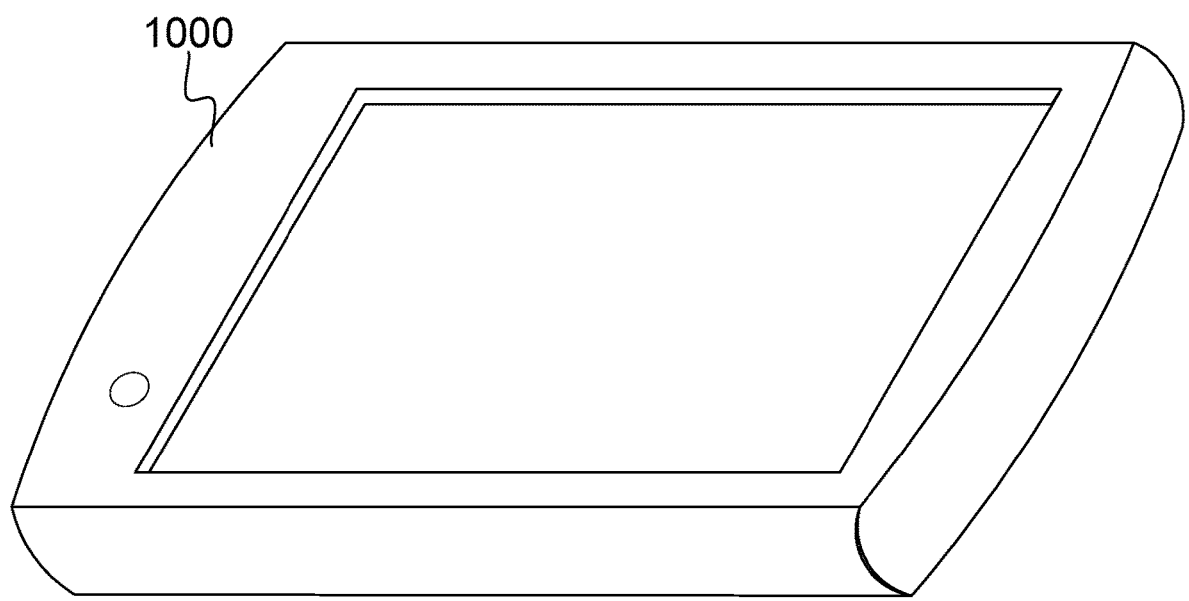
FIG. 10 illustrates a tablet computing device for executing one or more examples of the present disclosure.

FIG. 10 illustrates an exemplary tablet computing device 1000 that may execute one or more examples disclosed herein. Tablet computing device 1000 may comprise a client device 104. In addition, the examples and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which examples of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Examples of the present disclosure, for example, are described above with reference to block diagrams and/or operational illustrations of methods, systems, and computer program products according to examples of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

In addition, to protect the privacy of the user, any aggregation of potentially confidential data of or from a user or resulting from the input of a user may first be anonymized prior to being utilized in the systems and methods disclosed herein. Such anonymization may include the removal of some or all metadata or other data that may connect the results to be utilized to the individual user. The level of desired anonymization may be selected or customized by the user.

From the foregoing disclosure, it should be appreciated that the disclosure provides for various methods and systems, including a system comprising a machine-language-based classifier. The machine-language-based classifier is configured to receive a first user input requesting a digital assistant to perform a requested task; identify a first context for the user; analyze the first user input to determine first intermediate task data corresponding to the requested first task; provide the first context and the first intermediate task data as inputs to a machine learned language prediction model, wherein the machine learned language prediction model is trained from log data, the log data comprising historical data representing previous interactions between one or more users and one or more digital assistant applications; and receive as output from the machine learned language prediction model, first intermediate suggestion data for generating a first suggestion for the user, wherein the first suggestion is for a second task to be requested based on the inputs to the machine learned language prediction model. The system also comprises an output module, wherein the output module is configured to present the first suggestion to the user.

In addition, one having skill in the art will also appreciate the improvements to the functionality of the computing system from the systems and methods disclosed herein. For instance, by providing suggestions to the users for the most likely next task to be completed, computing resources of the device and the digital assistant are saved by not having to process continuous imperfect requests from the user. As discussed above, in the past, users would continuously provide input into a digital assistant without understanding what the optimal inputs were to achieve their desired task. With the technology herein, such inefficiencies can be lessened or eliminated. In addition, the device can also save resources by not having to process individual discrete rules programmed by human programmers.

The description and illustration of one or more examples provided in this application are not intended to limit or restrict the scope of the disclosure as claimed in any way. The examples, examples, and details provided in this application are considered sufficient to convey possession and enable others to make and use the best mode of claimed disclosure. Further, the terms "exemplary" and "illustrative" are meant only to be indicative of examples, and not to designate one example necessarily being more useful or beneficial over any other example. The claimed disclosure should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed disclosure.

The invention claimed is:

1. A computer-implemented method comprising:
   accessing log data including historical data representing previous interactions between one or more users and one or more digital assistant applications;
   extracting filters from previous queries in the log data;

extracting follow-up queries from the log data;
training a machine learned language prediction model based on the log data, the extracted filters, and the follow-up queries;
receiving a context for a current session between a user and a digital assistant; and
generating, based on the context, a surface form of a suggestion from the trained machine learned language prediction model.

2. The method of claim 1, wherein accessing the log data, extracting the filters, extracting the follow-up queries, and training the machine learned language prediction model occur offline, and wherein generating the surface form of the suggestion occurs at runtime.

3. The method of claim 1, wherein the context for the current session includes a user profile and device settings.

4. The method of claim 1, wherein the log data includes click-through data.

5. The method of claim 1, further comprising:
receiving user input requesting the digital assistant to perform a task; and
determining intermediate task data corresponding to the requested task,
wherein generating the surface form of the suggestion is further based on the intermediate task data.

6. The method of claim 5, wherein the intermediate task data includes at least one data type selected from the group consisting of a domain, an intent, and a slot.

7. The method of claim 1, wherein the suggestion is a suggestion for a task to be requested by a user.

8. A system comprising:
a machine learned language prediction module, wherein the machine learned language prediction module is configured to:
receive log data including historical data representing previous interactions between one or more users and one or more digital assistant applications;
train a machine learned language prediction model based on the log data;
receive user input and context for the user; and
generate intermediate suggestion data based on the received user input and context;
a machine-based classifier in communication with the machine learned language prediction module, the machine-based classifier configured to:
provide user input and context to the machine learned language prediction module; and
receive, from the machine learned language prediction model, the intermediate suggestion data; and
a language generation suggestion module configured to:
receive the intermediate suggestion data from the machine-based classifier; and
generate a surface form for a suggestion based on the received intermediate suggestion data.

9. The system of claim 8, wherein the intermediate suggestion data includes at least one data type selected from the group consisting of a domain, an intent, and a slot for generating the surface form for the suggestion to the user.

10. The system of claim 8, wherein the machine learned language prediction module is further configured to receive updated log data and update the machine learned language prediction model by training the machine learned language prediction model with the updated log data.

11. The system of claim 8, wherein the context for the user includes a user profile and device settings.

12. The system of claim 8, wherein training a machine learned language prediction model based on the log data occurs offline.

13. A system comprising:
at least one processor; and
memory storing instructions that when executed by the at least one processor perform a set of operations, the operations comprising:
accessing log data including historical data representing previous interactions between one or more users of one or more digital assistant applications;
extracting features from the log data, the features including at least one of a domain, an intent, or a slot from previous queries in the log data;
training a machine learned language prediction model based on the extracted features from the log data;
receiving a context for a current session between a user and a digital assistant; and
generating, based on the context, a surface form of a suggestion from the trained machine learned language prediction model.

14. The system of claim 13, further comprising extracting filters and follow-up queries to use in training the machine learned language prediction model.

15. The system of claim 13, wherein accessing the log data, extracting features, and training the machine learned language prediction model occur offline, and wherein generating the surface form of the suggestion occurs at runtime.

16. The system of claim 13, wherein the operations further comprise:
receiving user input requesting the digital assistant to perform a task; and
determine intermediate task data corresponding to the requested task, wherein generating the surface form of the suggestion is further based on the intermediate task data.

17. The system of claim 16, wherein the intermediate task data includes at least one data type selected from the group consisting of the domain, the intent, and or the slot.

18. The system of claim 13, wherein the machine learned language prediction model generates a probability distribution across the extracted features from the log data.

19. The system of claim 18, wherein the suggestion is generated based on at least a portion of the probability distribution across the extracted features from the log data.

20. The system of claim 13, wherein the operations further comprise:
receiving updated log data; and
training the machine learned language prediction model while offline with the updated log data to generate an updated machine learned language prediction model.

* * * * *